United States Patent Office 3,509,043
Patented Apr. 28, 1970

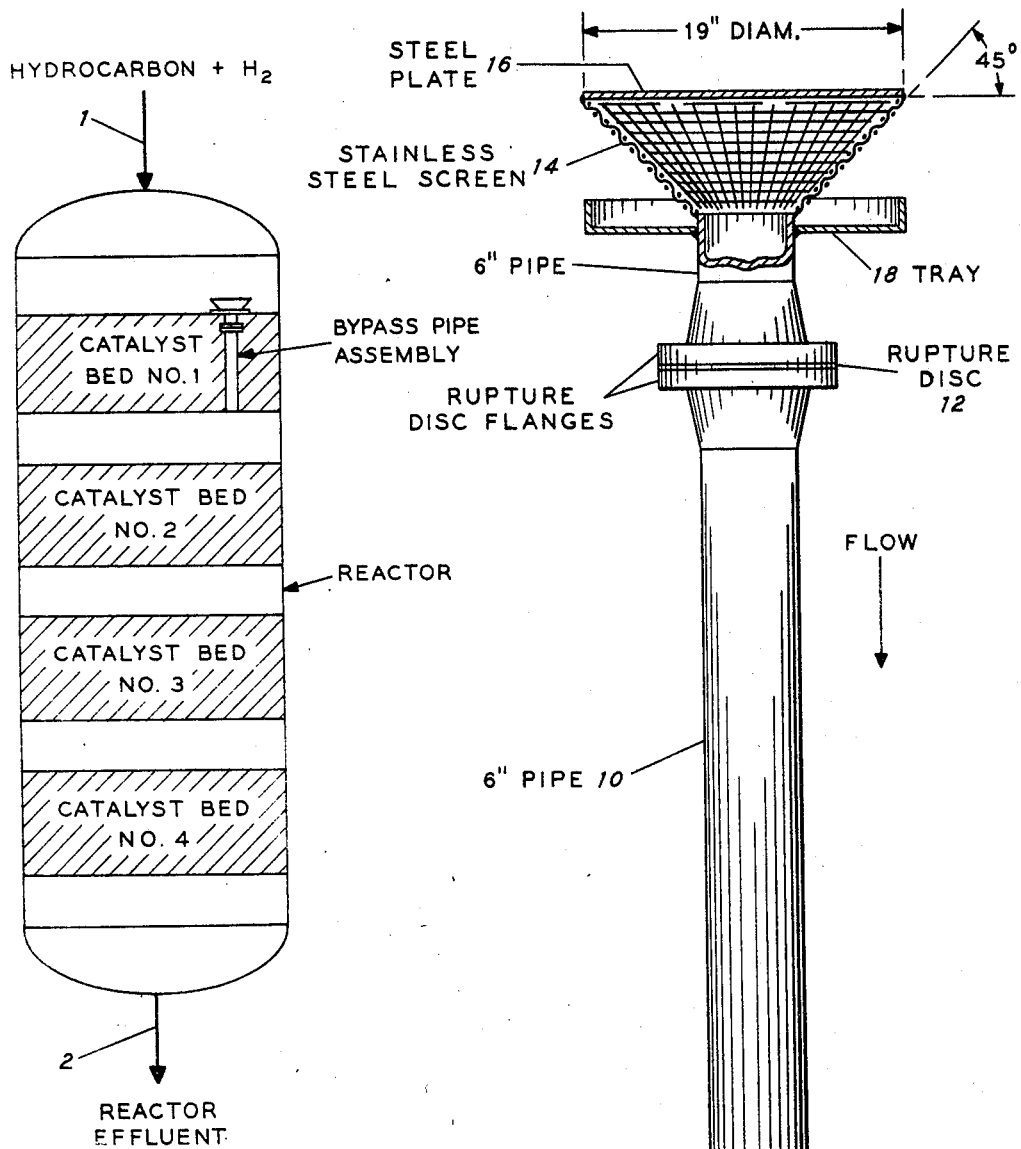

3,509,043
INCREASING CATALYST ON-STREAM TIME
John B. McMaster, Moraga, and Frank M. Parker, San Rafael, Calif., assignors to Chevron Research Company, San Francisco, Calif., a corporation of Delaware
Filed Nov. 14, 1967, Ser. No. 682,912
Int. Cl. C10g 23/02
U.S. Cl. 208—213                                    5 Claims

ABSTRACT OF THE DISCLOSURE

On-stream time for a reactor comprised of a series of fixed beds of catalysts is increased by providing one or more small bypass pipes through the upper catalyst beds. Metals and other materials which deposit in the top catalyst bed cause a relatively rapid increase in the pressure drop across the first bed. During the first part of the on-stream time, preferably the bypass is blocked by a disc which is placed in the bypass pipe. The disc bursts at a predetermined pressure drop so as to allow a substantial part of the reactants to bypass the first catalyst bed when the pressure drop has built up to the predetermined level. Thus, better utilization of the catalyst beds is obtained and the reactor may be operated for a longer period of time before it is necessary to stop operations for replacement of catalyst.

BACKGROUND OF THE INVENTION

Field of the invention

This invention relates to fixed bed catalytic processes. More particularly, it relates to hydrocarbon conversion processes wherein materials and scale are deposited in and on fixed beds of catalyst, thus causing pressure drop across the catalyst bed to increase.

Description of the prior art

The catalytic conversion processes to which this invention is applicable include hydrodesulfurization, hydrogenation, dehydrogenation, polymerization, alkylation, dealkylation, oxidation, isomerization, aromatization, cyclization, and other reactions of hydrocarbons of other fluid reactants wherein the reaction is induced or promoted by contact with a fixed bed of catalyst. It is known that the above-mentioned hydrocarbon processes are dependent upon catalyst reactivity for economical operation. However, it has been found, particularly in the use of charge materials containing sulfur, that scale and deposits are formed to such an extent that the catalyst bed is soon coated and "plugged" with this material, with the result that an excessive pressure drop develops across the catalyst bed. The net effect is decreased throughout because of pressure drop limitations and eventual shutdown of the process in order to replace the catalyst bed which has become plugged with the deposits.

In most fixed catalytic bed processes the catalyst bed is maintained in a cylindrical vessel on a suitable plate or grid in a manner such that the catalyst bed occupies the entire cross section of the vessel. This simple arrangement has many advantages and is nearly always used unless there are particular factors present which make its use undesirable. As indicated above, in hydrocarbon conversion processes the use of a simple fixed bed such as that described is frequently undesirable because the upper part of the bed becomes clogged due to the accumulation of scale which is carried into the catalyst bed by the stream of fluid passing through the bed. The problem becomes even more acute in processing relatively heavy oils according to well-known hydrotreating or hydrofining processes because in these hydrotreating processes there frequently is substantial deposition of metals onto the catalyst.

The metal contaminants found in petroleum may be in the form of metal oxides or sulfides or as soluble organo-metallic material. The metal contaminants may be found in crude oil as it comes from the well or they may be introduced into the crude (or other hydrocarbon fraction being processed) from metallic materials used in handling. These metal contaminants include iron, nickel, vanadium, molybdenum, tungsten, etc. The organo-metallic compounds are typically known as porphyrins.

Some metal contaminants such as oxides or sulfides which are in the solid state may be removed from a petroleum fraction simply by filtering the fraction. A part of the water soluble metal salts may be removed by washing the fraction and some of the organo-metallic compounds may be removed by clay treating or solvent extraction or suitable distillation techniques wherein the boiling range fraction in which most of the organo-metallic compounds are concentrated is separated from the rest of the charge and discarded or used for low value applications. Any one of these techniques or all four combined, however, cannot do a complete job of removing metal from heavier fractions because washing, clay treating and solvent extraction all have process limitations with respect to metals removal and because some of the organo-metallic compounds boil throughout most of the higher boiling ranges. It is also apparent that it is uneconomic to discard or utilize for relatively low value applications substantial parts of the heavier petroleum fractions.

Thus the necessity for obtaining a method to economically treat hydrocarbons containing scale and/or metals which tend to plug a fixed bed of catalyst is apparent.

SUMMARY OF THE INVENTION

According to the present invention, a method is provided for increasing on-stream time for a reactor vessel containing a series of fixed beds of catalyst wherein feed to the fixed beds is a reactant containing material which deposits in the fixed beds, which comprises bypassing part of the reactants through at least one bypass pipe through at least one of the first in series of the fixed beds, said bypass pipe running in the direction of flow of feed through the fixed bed and having a cross-sectional flow area less than $\frac{1}{50}$ that of the fixed bed so that as deposits in the bed build up more reactants will flow through the bypass pipe, thus reducing the amount of pressure drop buildup as material deposits in the bed.

Although the concept of a bypass pipe through one or more of the first beds has been determined to be advantageous, it further has been found advantageous to install a flow blocking devise in the bypass pipe to allow flow through the bypass pipe only when the pressure drop through a given bed becomes excessive. Thus, according to a preferred embodiment of the invention, the bypass pipe is initially blocked by a device that will burst (i.e., fail or open) at a predetermined pressure drop, thus allowing reactants to bypass the bed only when said predetermined pressure drop is reached due to material depositing in the bed.

As indicated previously, one present area where "plugging" of the catalyst bed is a particularly acute problem is that of hydrotreating hydrocarbons, particularly heavy hydrocarbon fractions, a substantial portion of which fraction is material boiling above 650° F. at atmospheric pressure. These hydrocarbon fractions generally contain at least 1 p.p.m. organo-metallic compounds and sometimes in excess of 50 to 100 p.p.m. organo-metallic compounds (p.p.m. by weight as metals). These metal compounds cause serious plugging problems. Thus in a preferred embodiment of the invention, hydrocarbons, a substantial portion of which boil above 650° F., are passed through a reactor at elevated temperature and pressure together with hydrogen in accordance with known hydrotreating or hydrofining processes. The reactor is comprised of a series of fixed beds containing hydrotreating catalyst with at least one bypass pipe through the first bed in the direction of flow through the catalyst bed. Preferably this bypass pipe is initially blocked by a disc that will rupture at a predetermined pressure drop, thus allowing a substantial part of the reactants to bypass the catalyst bed when the pressure drop has built up to a predetermined amount due to material deposited in the bed.

BRIEF DESCRIPTION OF THE DRAWINGS

FIGURE 1 is a schematic drawing of a reactor containing a series of catlayst beds and showing the position of the bypass pipe assembly. FIGURE 2 is a blown up drawing schematically showing a bypass pipe assembly.

DETAILED DESCRIPTION AND DESCRIPTION OF A PREFERRED EMBODIMENT

Referring now to FIGURE 1, hydrocarbon feed plus hydrogen are introduced in line 1 to the reactor in accordance with known hydrotreating processes. As the hydrocarbon plus hydrogen pass over the uppermost catalyst bed, some scale contained in the hydrocarbon feed will be deposited on the upper part of the bed but more importantly, in the case of most feeds, organo-metallic compounds contained in the hydrocarbon feed react so as to "split out" the metal atom or atoms. These metal atoms deposit to a large extent in the interstitial area of the catalyst bed, particularly in the upper portion of the catalyst bed thus decreasing available flow area through the bed. Frequently the metals deposit as sulfides, such as iron sulfide, etc. The hydrocarbon and hydrogen pass downward through the reactor across the subsequent beds of catalyst to achieve desired conversion of the hydrocarbon feed; for example, from a heavy oil to a lighter hydrocarbon boiling in the gasoline range. The process hydrocarbon effluent is withdrawn in line 2.

Because the top catalyst bed, that is, catalyst bed No. 1, is the first bed through which the hydrocarbon feed passes, substantial amounts of metals and other material will be deposited in this bed under normal circumstances while substantially less material is deposited in the lower catalyst beds. Thus a pressure drop across catalyst bed No. 1 builds up to a substantially larger amount than in the lower catalyst beds.

Hydrotreating catalysts include, for example, metals of the 6th and/or 8th group, generally on a support such as silica, alumina or charcoal. More particularly, the catalyst may be Co and Mo compounds on a silica and/or alumina support. Also Ni and Mo compounds on a silica-alumina support is particularly advantageous in hydrotreating hydrocarbons, particularly heavy oils and residua which have high concentrations of organo-metallic compounds that result in severe fixed catalyst bed plugging problems. It is to be understood that in the hydroconversion reaction referred to in this application there may be substantial hydrocracking, hydrogenation, isomerization, etc., occurring. However, the present invention is foremost concerned with hydrotreating or hydrofining processes, even though the invention may be advantageously applied to other fixed catalyst bed processes.

According to the concept of the present invention, it has been determined that substantial savings, mostly through increased on-stream time, may be made by providing a bypass pipe through the uppermost catalyst bed. This pipe is typically between 3 to 6 inches in inside diameter for beds in the range of 5 to 10 feet in diameter. According to the present invention the cross-sectional flow area of the bypass pipe is less than $1/50$ that of the fixed bed and generally is between $1/50$ and $1/1000$ of the fixed bed cross-sectional flow area. Preferably the bypass pipe cross-sectional flow area is between $1/150$ and $1/600$ that of the fixed bed. When no bursting disc is used to prevent flow through the bypass pipe up to a predetermined pressure drop, then it is preferred to use a bypass pipe that has a cross-sectional area only about $1/400$ to $1/600$ of the fixed bed cross-sectional area. This relatively small bypass pipe will thus not allow a large amount of reactants to bypass the first bed until pressure drop has increased significantly due to deposits in the bed. In other words, when the bypass pipe is left unblocked, increasing amounts of feed pass through the bypass pipe as the bed becomes increasingly plugged as the on-stream time continues, with little bypass taking place initially. The reactants leaving catalyst bed No. 1 are redistributed before entrance into catalyst bed No. 2 to help prevent channeling through catalyst bed No. 2. The reactants which bypass catalyst bed No. 1 contain materials which deposit in catalyst bed No. 2. Thus the use of the bypass pipe results in better distribution of depositing material. This in turn results in increased duration of on-stream time. In some instances the increased on-stream time is as much as one week per year, which in the case of a unit processing 40,000 b./d. is worth nearly 500,000 dollars per year in production.

Within the concept of the invention, one preferred embodiment is to provide lateral holes in the bypass pipe, that is, holes in the pipe positioned so as to sparge the bypassing material out into the bed instead of allowing all the bypassing reactants to pass completely through the pipe and down to the next catalyst bed. This method of using the bypass pipe allows more uniform deposition of material in catalyst bed No. 1.

Although only one bypass pipe is shown for illustration purposes several may be employed through any of the uppermost catalyst beds within the concept of this invention. Also, the catalyst particles in any given bed may be mixed with other particles. Particularly the top bed advantageously consists entirely of or nearly entirely of inert particles and the particles may have sufficient interstitial void space so that it is more advantageous to provide a bypass only through catalyst bed No. 2. Thus one special embodiment of the invention comprises installing a bypass pipe through the second bed. In this embodiment the first bed serves to remove material that is removed from the reactants relatively easily, such as scale, tramp particles and at most only a minor portion of metals present as organometallic compounds in the hydrocarbon feed. There is sufficient void space provided in the first bed so that the depositing material does not cause the pressure drop to become excessive relative to the other bed or beds. The second bed has increased hydroconversion catalytic activity (and correspondingly generally smaller size particles of catalyst with less interstitial void space) relative to the first bed, thus resulting in considerably more deposition of metals from the organometallic compounds. Also, the first bed may initiate a decomposition of the organometallic compounds resulting in high metals deposition rates in the second bed. The installation of the bypass pipe in the second bed will thus allow longer on-stream time by allowing increased amounts of reactants to bypass to the third bed as the deposits increase pressure drop in the second bed. However, primarily because reactor volume is expensive in terms of capital investment, it has been determined more advantageous to have at least 20 volume percent catalyst particles in catalyst bed No. 1, generally 40 to 70 volume percent, and to provide a bypass pipe through this top bed.

Although the fixed beds are shown in one cylindrical reactor, which is a preferable mode of operation, they may be in a series of reactors. Also, the beds need not be in cylindrical reactors, but it is basic to the concept of the invention that there be a series of at least two catalyst beds.

In FIGURE 1 the bypass pipe assembly is shown with a rupture disc to prevent bypass of catalyst bed No. 1 until the pressure drop has built up to predetermined amount. One of the primary advantages in this method of operation is the full use of catalyst bed No. 1 until the pressure drop becomes excessive. When the pressure drop becomes excessive, a substantial portion of the feed, generally between 40 and 80% by weight, passes through the bypass pipe with the disc ruptured. The opening of the bypass pipe reduces the pressure drop and allows increased on-stream time.

Referring now to FIGURE 2, an enlarged schematic view of the bypass pipe assembly is shown. The assembly consists basically of a 6 inch pipe 10, with rupture disc 12 inserted in the pipe between the rupture disc flanges. This disc is preferably Inconel, which is an alloy consisting of about 72% nickel, 14% chromium, 10% iron, 1% manganese, and 1% miscellaneous materials, such as silicon. The disc of Inconel is veneered with two sheets of platinum. In one installation of this disc, the disc was found to rupture cleanly along its inside diameter as circumscribed by the inside diameter of the rupture disc flanges. To insure that the disc does not block flow through the bypass pipe when it falls through the pipe onto the screen supporting the catalyst in the top bed, the exit end of the pipe should be approximately double the cross-sectional flow area of the bypass pipe. For example, for a 6″ bypass pipe preferably the last 12″ of the pipe should be about 8.5″ in diameter. Alternatively, the bypass pipe should run through the screen supporting the top catalyst bed so that the rupture disc may fall free of the bypass pipe and screen and thus not block flow after rupturing.

Hydrocarbons and other reactants enter the bypass pipe assembly through stainless steel screen 14 which is in the configuration of an inverted frustrum of a cone. Holes through the screen are about ⅛ inch square. Above the screen is an impervious steel plate 16 which prevents any flow from directly entering the bypass pipe along the direction of flow through the reactor. The tray 18, which is around the circumference of the pipe and directly below the stainless steel screen, is provided to create an area free from catalyst particles and to prevent catalyst and other particles from being swept against the screen by the stream of reactants flowing into the bypass pipe, thus blinding the screen and causing excessive pressure drop.

Although various specific embodiments of the invention have been described and shown, it is to be understood they are meant to be illustrative only and not limiting. Certain features may be changed without departing from the spirit or essence of the invention. It is apparent that the invention has broad application to increasing on-stream time for catalytic processes wherein a series of fixed beds of catalysts are used. Accordingly, the invention is not to be construed as limited to the specific embodiments illustrated but only as defiend in the following claims.

We claim:

1. A method for increasing on-stream time for a reactor vessel containing a series of fixed beds of catalyst wherein feed to the fixed beds comprises a reactant containing material which deposits in the fixed beds causing an increase in pressure drop across the fixed bed, which comprises bypassing part of the reactants through at least one bypass pipe through at least one of the first fixed beds in the direction of flow of feed through the reactor, said bypass pipe running in the direction of flow of feed through the fixed bed and said bypass pipe being initially blocked by a device that will burst open at a predetermined pressure drop across the fixed bed, thus allowing reactants to bypass the bed when said predetermined pressure drop is reached due to material depositing in the bed.

2. A method as in claim 1 wherein the feed to the reactor comprises a heavy hydrocarbon, a substantial portion of which boils above 650° F. at atmospheric pressure and the catalyst is a hydrotreating catalyst, said heavy hydrocarbon being fed to the reactor at elevated temperature and pressure together with a hydrogen-containing gas.

3. A method as in claim 2 wherein the feed to the reactor contains at least four parts per million by weight as iron of hydrocarbon soluble organo-metallic compounds of iron.

4. A method as in claim 1 wherein the bypass pipe has a cross-sectional flow area less than $\frac{1}{150}$ of that of the fixed bed through which the bypass pipe bypasses reactants.

5. A method as in claim 1 wherein the bypass pipe has a cross-sectional flow area less than $\frac{1}{400}$ of that of the fixed bed through which the bypass pipe bypasses reactants.

References Cited

UNITED STATES PATENTS

| | | | |
|---|---|---|---|
| 2,245,145 | 6/1941 | Hall et al. | 23—288 |
| 2,257,178 | 9/1941 | Martin et al. | 208—146 |
| 2,587,149 | 2/1952 | Gwynn | 208—213 |

DELBERT E. GANTZ, Primary Examiner

G. J. CRASANAKIS, Assistant Examiner

U.S. Cl. X.R.

23—288; 208—146, 152, 253; 210—20